July 7, 1953  A. VALENTINI ET AL  2,644,880
ELECTRIC GRILL
Filed May 13, 1950  3 Sheets-Sheet 1
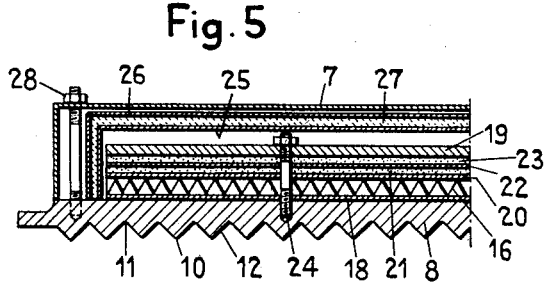
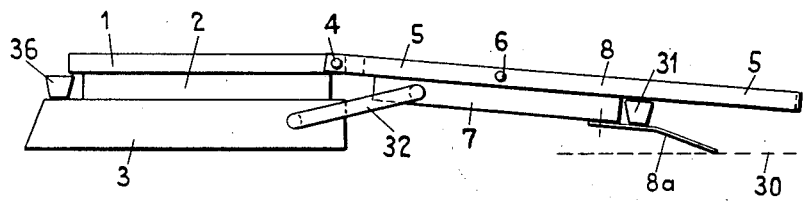
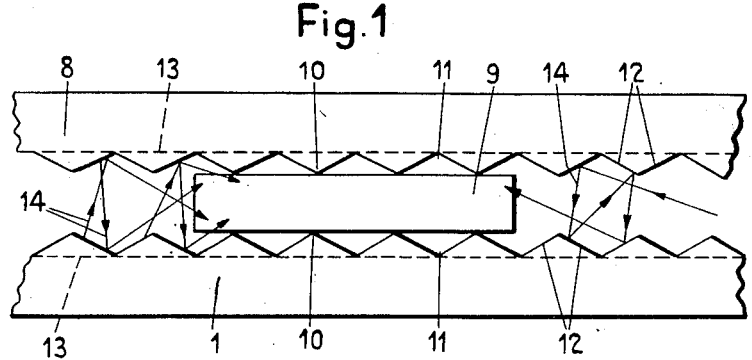
INVENTORS:
ALDO VALENTINI
TRAUGOTT OERTLI July 7, 1953
A. VALENTINI ET AL
2,644,880
ELECTRIC GRILL
Filed May 13, 1950
3 Sheets-Sheet 2
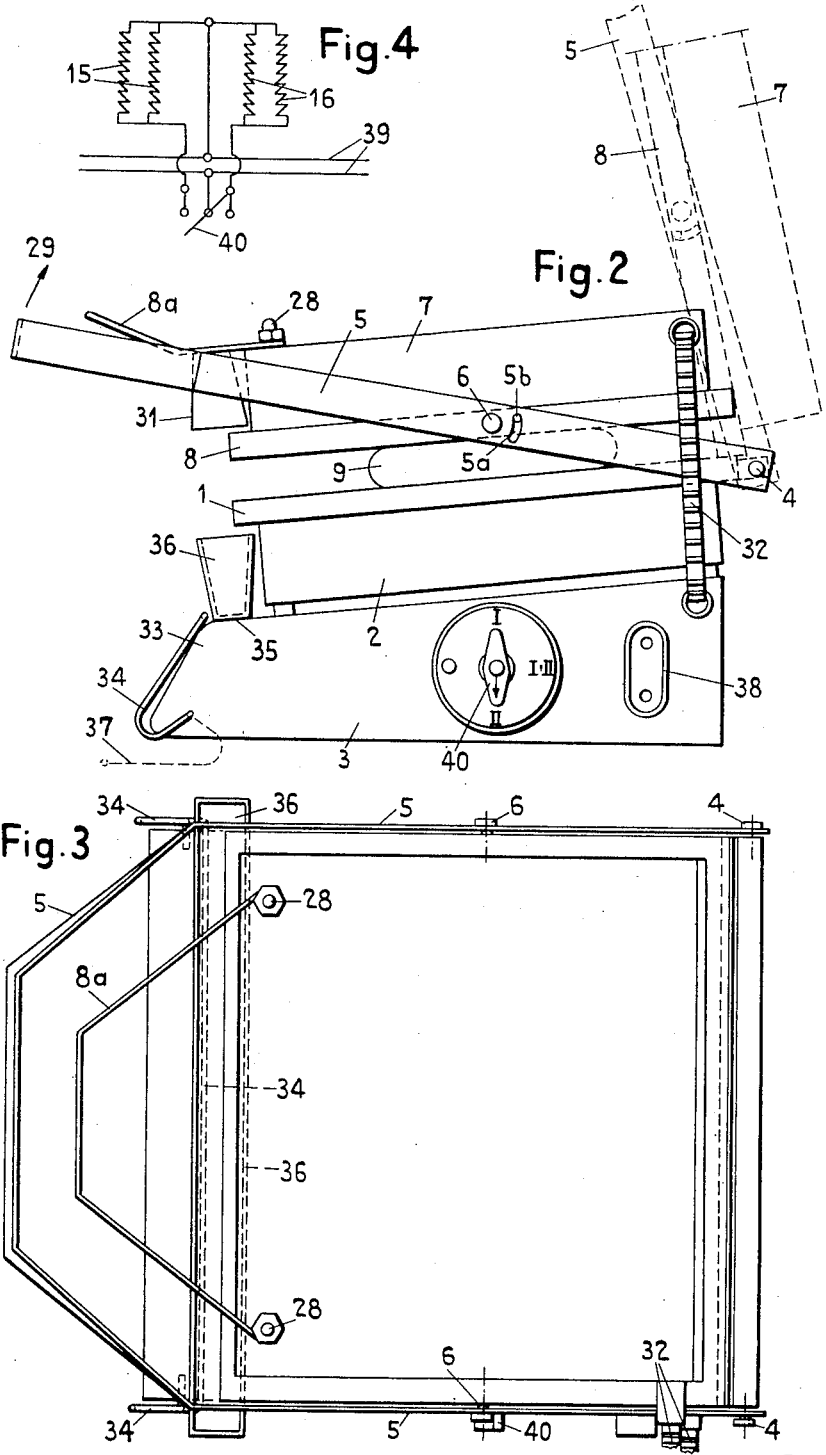
INVENTORS
ALDO VALENTINI
TRAUGOTT OERTLI

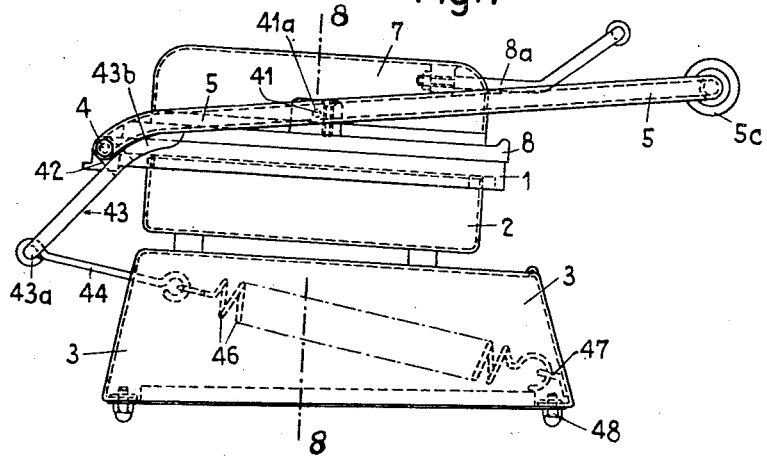
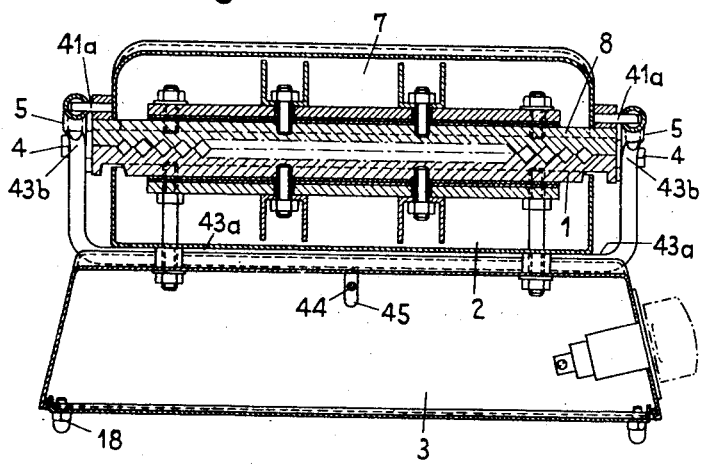

Patented July 7, 1953

2,644,880

UNITED STATES PATENT OFFICE 2,644,880

ELECTRIC GRILL

Aldo Valentini, Lausanne, and Traugott Oertli, Zurich, Switzerland, assignors to Techag A. G., Kusnacht-Zurich, Switzerland Application May 13, 1950, Serial No. 161,752
In Switzerland May 15, 1949

5 Claims. (Cl. 219—19)

The present invention relates to an electrically operated grill.

It is an object of the present invention to provide means facilitating the arrangement of two heating plates with infra-red rays emitting elements, which plates are movable one with respect to the other so as to be located with their heating surfaces in face to face relation, at least one of these plates possessing a section with a plurality of saw-tooth shaped flutes extending from the front toward the rear of this plate, whereby when the two heating plates are positioned one opposite the other, at least a part of the heating or infra-red rays emitted from the one plate is reflected at an angle toward the surface of the other heating plate.

It is another object of the invention to provide means affording utmost economy as well as safe and simple manipulation in the operation of the electric grill, which may be employed in the house and also in restaurants.

It is a further object of the invention to provide means conducive to a very effective grill structure, which permits swinging movements of one of the heating plates, so that the same may assume either parallel or any desired angular position with respect to the other heating plate.

Still another object of the invention is to provide means ensuring balanced position of the one heating plate to the other heating plate and coupling of said plates only in predetermined positions thereof.

Other features of the invention will appear from the claims, the following description, and the accompanying drawings which show by way of example certain forms of embodiment incorporating the invention.

Fig. 1 shows a section through the two heating plates arranged one opposite the other and as seen from the front end thereof;

Fig. 2 is a side elevation of the grill;

Fig. 3 is a top plan view of the grill;

Fig. 4 is a wiring diagram employed in the invention.

Fig. 5 is a part-sectional view of a heating element and the corresponding heating plate;

Fig. 6 represents a diagrammatic view of the grill with one of the heating plates swung to the rear of the grill.

Fig. 7 is a side elevational view of a modified form of the grill;

Fig. 8 is a part-sectional view taken along line 8—8 of Fig. 7.

The grill as illustrated in Fig. 2 has a lower heating plate 1 fixed to a casing 2 which in turn is attached to a base frame 3. One end of the plate 1 is provided with two lateral axles 4 carrying a bail-shaped operating lever 5 which, by means of two pivots 6, swingably supports the upper heating plate 8 with its casing 7, the plate 8 being adapted to be swung opposite the plate 1 in a position of use. The axes of the pivots 6 pass substantially through the center of gravity of the plate 8. The movable plate 8 can thus pivot about the axle 4 and at the same time about the pivots 6 of the lever 5. Handle 8a may be employed to adjust the plate 8 to foodstuff 9 when placed on lower fixed plate 1 (Fig. 2).

The two arms of bail-shaped lever 5 may be provided with two slots 5a engaged by two corresponding pins 5b fixed to plate 8 at each side thereof; thus, it will immediately become clear that the angular displacements of the plate 8 on lever 5 may be limited.

The heating plates 1 and 8 are preferably made of an alloy of cast-iron and chromium, the quantity of chromium being approximately between 0.1 and 0.4 per cent of the total weight; after being cast, these plates 1 and 8 are subjected to a heat treatment.

On their face adapted to come into contact with the foodstuff 9, the plates 1 and 8 are provided with grooves or flutes having a saw-tooth profile (Figs. 1 and 5) with saw-tooth apices or tips 10 and saw-tooth gaps 11. The flanks or reflecting faces 12 defining the saw-tooth extend at an angle of between 45° and 70° with respect to base line 13 passing through the base of the saw-teeth.

The surface of the heating plates 1 and 8 may be polished in order to increase the reflecting effect of the heat or infra-red rays 14 emitted by the heating plates; this occurs when these plates 1 and 8 are arranged face to face and parallel to each other for grilling the foodstuff 9; at least a part of the heat rays 14 are then reflected at acute angles by the surfaces bounded by the flanks 12 of the saw teeth.

With the heating plates 1 and 8 arranged facing each other and in parallel, the heat rays are infrared rays emitted by one of the plates are reflected by the surface of the other plate and are thus utilised several times in such a way that the heating effect of the two plates 1, 8 is four to eight times greater than that of one plate alone.

In addition, when the plates 1 and 8 have their surfaces opposite each other as in Fig. 1, the rays 14 are not only reflected perpendicularly as is the case with plane surfaces, but these rays are mostly reflected at acute angles and are consequently directed towards the foodstuff 9 held between the tips of the teeth (Fig. 1). Since the purpose is to heat this foodstuff, the quickness of the heating process and hence the efficiency of the grill is further increased. In spite of the quickness of grilling with the described plates, the food is not burned on its surfaces, since the heat rays are mostly absorbed by the moisture contained in the foodstuff, so that the latter is heated primarily internally, and secondarily externally.

The grill may be designed so that the upper heating plate 8 has a heating surface smaller than that of the lower plate 1.

A grill may likewise be made in which one of the heating plates has a plane surface.

The heating elements 15 and 16 (Fig. 4) of the heating plates 1 and 8 are located in the casings 2 and 7.

The heating plate 8 is separated from its heating element 16 by a layer of mica 18 forming an electrically insulating layer therebetween (Fig. 5). The heating element 16 is insulated from the clamping plate 19 by a further layer of mica 20, an asbestos plate 21, an aluminum foil 22 and an asbestos plate 23. The metallic foil 22, the heat insulating mica layer 20 and asbestos plate 23 cooperate to form a reflecting means partially encasing the adjacent heating element 16 and deflecting the rays emitted from the latter toward the adjacent heating plate. The clamping plate 19 is secured to the heating plate 8 by screws 24 and is covered by two aluminum foils 25 and 26, between which is interposed a layer of asbestos or of glass wool 27; the aluminum foils 25 and 26, as well as the layer 27, thus laterally surround the clamping plate 19 and the heating element 16. The structure thus obtained is enclosed by the casing or cover 7 secured in position by means of two bolts 28.

The different materials within the casing 7 ensure very good insulation of the heating element 16; in addition they send back to the heating plate 8 a part of the heat rays emitted by the element 16, thus increasing the efficiency of the plate 8.

The plate 1, the heating element 17 and the casing or cover 2, are insulated in the same manner as described with respect to plate 8.

The bolts 28 serve also to fix the stirrup-shaped handle 8a, which when the lever 5 is moved in the direction of the arrow 29 (Fig. 2) can come to rest on a support 30 (Fig. 6) and allow the plate 8 to be utilized in this latter position; in this case the stirrup-shaped handle 8a supports a container 31 adapted to catch and receive any foodstuff juices flowing from plate 8.

The lever 5 may also be moved in the direction of arrow 29 until the plate 8 rests against a catch or stop (not shown) in the position illustrated in broken lines in Fig. 2.

The conductors for electric current to the heating element 16 in the casing 7 are located within a flexible tubing 32 extending between the casing 7 and the frame 3.

The frame 3 is provided at its end 33 with a pivotally mounted rod element 34 which, in the position shown, allows surface 35 of base 3 to extend in a slant toward the front of the grill where a container 36 is adapted to catch juices flowing down the surface or flutes of the heating plate 1.

The rod element 34 may be brought into position indicated at 37 to support the end 33 of base 3 in such manner that the heating plate 1 is substantially horizontal.

The grill as illustrated may be used for grilling a piece of meat 9 placed between the heating plates 1 and 8 set facing each other; but these latter may also be used separately and are then brought in the position as seen in Fig. 6.

One of the outer walls of the base 3 carries a socket 38 adapted to connect the heating elements to a source of electric current supply 39 (Fig. 4), and also a switch 40 for controlling the supply to the heating element 16 or 17, or to both of these heating elements simultaneously.

One modified embodiment of the invention provides for arranging a plate of asbestos and a plate of mica between each heating element and the corresponding fixing plate, this fixing plate being separated from the cover by an aluminum foil and a layer of glass wool.

According to the form of embodiment of Figs. 7 and 8, the movable heating plate 8 is provided with a balance-weight.

Also in this form, a stirrup-like lever 5 is jointed with the ends of its lateral arms to the lower heating plate 1 at both sides thereof at 4. At the bridge or front end the lever 5 has gripping means 5c. In the axis 41 passing through the center of gravity of the upper heating part 7, 8, the movable grill part 7, 8 is suspended or jointed to the lever 5 by means of two axle pieces 41a.

The upper part 7, 8 of the grill is consequently not only swivably arranged with respect to the lower heating plate about said axis 4 by means of lever 5, 5c, but can also by itself be directly swivelled on and relative to lever 5, a stirrup-lever 8a being connected for this purpose to the upper part 7 serving as handle. In this manner, the upper heating plate can be swung and maintained in any desired parallel or oblique balanced position with respect to the lower heating plate, depending on the geometrical form of cross-section of the food to be grilled.

The upper grill part 7, 8 can be freely swivelled about the axis 4 and also about the axis 41, and in order to be able not only to set it in any desired swivelled position, but also to keep it thereby in equilibrium, the following balancing member is provided.

To the axis 4 on opposite ends thereof a two-armed lever 43 is pivotally attached by means of straps 42, one arm of each lever being united to the other by means of a bridge-piece 43a to form a stirrup (Fig. 8), while the other arms 43b terminate in free ends which loosely engage under the lateral arms of lever 5 near the axis on pivot 4. Attached to said bridge-piece 43a is a rod 44 passing through a slot 45 in base or frame 3 (Fig. 8), which rod 44 is hooked into the end of a coil spring 46 whose other end engages an eye or ring 47 held on the base or frame 3 by a screw which is attached to the base foot 48 thereof. Switch 40 (Fig. 8) controls the current supply as stated.

The proportioning of the lever arms to each other and to the force of the spring 46 is so chosen that, when the upper heating plate 8 is in the most important positions for use with respect to the lower heating plate 1, the heating plate 8 remains in balance in any desired position into which it has been brought, after the levers 5 and 8a have been moved accordingly to such position. This produces the advantage that a person handling the grill is not subject to fatigue because of frequent manipulations of the levers 5 and 8a or from frequent setting and readjusting of the movable heating plate. Furthermore, this plate does not press down with its full weight onto the food being grilled, but remains substantially in any desired position.

Accordingly there has been provided a grill which includes a base, two heating plates maintained on the base, electric heating means for said plates adapted to emit infra-red rays, first lever means extending from the rearward end of one of the heating plates to and beyond the forward end of both the heating plates, the lever means including a first pivot positioned at the rearward end of one heating plate, and a second pivot positioned on the first lever means between the forward end of the other heating plate and the first pivot, whereby the other heating plate may be independently swung about the first pivot and then about the second pivot.

Further, there has been provided a second lever means which is spring supported within the base and operatively connected to the first lever means, at least one of the heating plates being provided with surfaces for reflecting the infrared rays from one heating plate toward the other heating plate.

Although only two embodiments of the present invention have been described, it is readily apparent to one skilled in the art that numerous other modifications can be made without departing from the spirit of the invention as set forth in the appended claims.

Having thus described the invention, what is claimed as new and desired to be secured by Letters Patent, is:

1. The combination, in a grill apparatus, of a base having a forward end and a rearward end and a surface inclined toward said forward end, with two infra-red rays emitting heating plates having a forward end and a rearward end and mounted on said base surface to normally slant toward said forward end of the latter, lever means extending from the rearward end of one of said heating plates to said forward end of said heating plates and including, respectively, first and second pivot means, said first pivot means being positioned at the rearward end of said one heating plate, said second pivot means being positioned on said lever means between said first pivot means and said forward end of said other heating plate, whereby said other heating plate may be independently swung first about said first pivot means and then about said second pivot means relative to said one heating plate, operable means mounted on said base for moving the latter relative to a support to thereby change the position of said inclined surface with respect to said forward end of said base, lengthy angularly shaped flutes provided in the surface of at least one of said heating plates and extending from the forward end of the latter toward the rearward end thereof, to thereby reflect said infra-red rays toward the other heating plate, and gripping means forming part of said lever means and extending forwardly thereof beyond said forward end of said base.

2. A grill apparatus having a hollow base containing spring means, which base has a forward end, a rearward end and a surface inclined toward said forward end; comprising two infra-red rays emitting heating plates having a forward end and a rearward end, one of said heating plates being mounted on said base surface to slant toward said forward end of the latter, first lever means extending from the rearward end of said one heating plate to and beyond said forward end of both said heating plates and including, respectively, first and second pivot means, said first pivot means being positioned at the rearward end of said one heating plate, said second pivot means being positioned on said first lever means at the point of gravity of said other heating plate and between said forward end of said other heating plate and said first pivot means, whereby said other heating plate may be independently swung first about said first pivot means and then about said second pivot means relative to said one heating plate, second lever means supported by said spring means within the interior of said base, said second lever means abutting against and below said first lever means at a location thereof intermediate said first pivot means and forming a support for said first lever means, readily separable from the latter and said second pivot means, lengthy angularly shaped flutes provided in the surface of at least one of said heating plates and extending from the forward end of the latter toward the rearward end thereof, to thereby reflect said infra-red rays toward the other heating plate, first gripping means forming part of said first lever means and extending across and forwardly of the latter, and second gripping means extending from said other heating plate and terminating short of said first gripping means.

3. A grill apparatus comprising a base, spring means anchored to said base, two heating plates having a forward end and a rearward end and mounted on said base, electric heating means for said plates and adapted to emit infra-red rays, first lever means extending from the rearward end of one heating plate to and beyond said forward end of both said heating plates and including, respectively, first and second pivot means, said first pivot means being positioned at the rearward end of said one heating plate, said second pivot means being positioned on said first lever means substantially in alignment with the center of gravity of said other heating plate and between said forward end of said other heating plate and said first pivot means, whereby said other heating plate may be independently swung first about said first pivot means and then about said second pivot means relative to said one heating plate, and second lever means supported by said spring means within and extending beyond said base, said second lever means being operatively connected to said first lever means, at least one of said heating plates being provided with a plurality of juxtapositioned grooves for reflecting infra-red rays from said one heating plate toward the other heating plate, each electric heating means including layers of asbestos and mica, respectively, which encase each heating means, and means in contact with said heating plates, respectively, and surrounding said mica and asbestos layers in spaced relation thereto, said latter means including at least one foil of aluminum.

4. A grill apparatus comprising a base, spring means anchored on said base, two heating plates having a forward end and a rearward end and mounted on said base, electric heating means for said plates and adapted to emit infra-red rays, first lever means extending from the rearward end of one heating plate to and beyond said forward end of both said heating plates and including, respectively, first and second pivot means, said first pivot means being positioned at the rearward end of said one heating plate, said second pivot means being positioned on said first lever means between said forward end of said other heating plate and said first pivot means, whereby said other heating plate may be independently swung first about said first pivot means and then about said second pivot means relative to said one heating plate, and second lever means attached to said spring means and extending from the latter beyond said base, said second lever means being operatively connected to said first lever means, at least one of said heating plates being provided with a plurality of juxtapositioned grooves for reflecting infra-red rays from said one heating plate toward the other heating plate, each of said electric heating means including layers of asbestos and mica, respectively, which confront each heating means, and cover means in contact with said heating plates, respectively, and spaced from the adjacent mica and asbestos layers, said cover means including at least one metallic layer.

5. A grill apparatus comprising a base, spring means anchored on said base, two heating plates each having a forward and a rearward end and mounted on said base, respective electric heating means connected to said plates and adapted to emit infra-red rays through said plates, first lever means extending from the rearward end of one heating plate to and beyond said forward end of both said heating plates and including, respectively, first and second pivot means, said first pivot means being positioned adjacent the rearward end of said one heating plate and above said base, said second pivot means being positioned on said first lever means between said forward end of said other heating plate and said first pivot means, whereby said other heating plate may be swung first about said first pivot means and then about said second pivot means relative to said one heating plate and said base, and second lever means attached to said spring means and extending from the latter beyond said base, said second lever means extending below and in contact with said first lever means, at least one of said heating plates being provided with a plurality of juxtapositioned grooves saw-tooth-shaped in cross-section for reflecting infra-red rays from said electric heating means and said one heating plate toward the other heating plate.

ALDO VALENTINI.
TRAUGOTT OERTLI.

References Cited in the file of this patent

UNITED STATES PATENTS

| Number | Name | Date |
| --- | --- | --- |
| 1,257,513 | Messmer | Feb. 26, 1918 |
| 1,375,801 | Ross | Apr. 26, 1921 |
| 1,450,277 | Brown et al. | Apr. 3, 1923 |
| 1,480,084 | Lamb | Jan. 8, 1924 |
| 1,483,000 | Kruesheld | Feb. 5, 1924 |
| 1,656,662 | Carter et al. | Jan. 17, 1928 |
| 1,678,690 | Connell | July 31, 1928 |
| 1,790,194 | Amacher | Jan. 27, 1931 |
| 1,856,864 | Claus | May 3, 1932 |
| 1,859,004 | Reich | May 17, 1932 |
| 1,966,411 | Kaufmann | July 10, 1934 |
| 2,031,259 | Fox | Feb. 18, 1936 |
| 2,033,067 | Fromknecht | Mar. 3, 1936 |
| 2,313,968 | Reich | Mar. 16, 1943 |